H. G. LUDLOW.
Valves for Fire-Plugs and Stop-Valves.
No. 154,878. Patented Sept. 8, 1874.
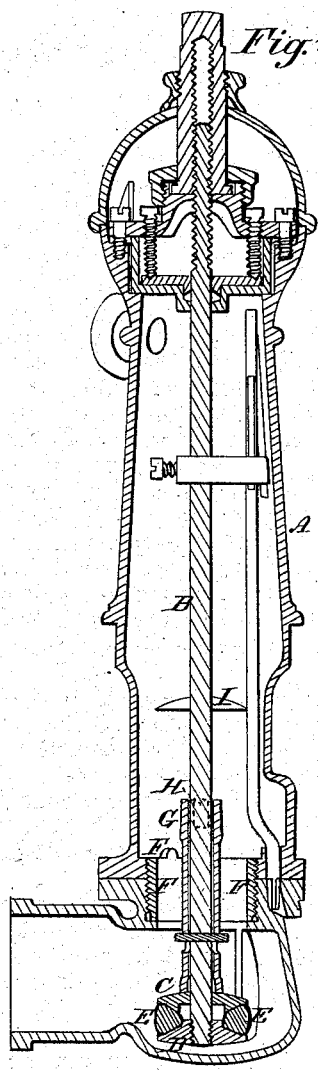
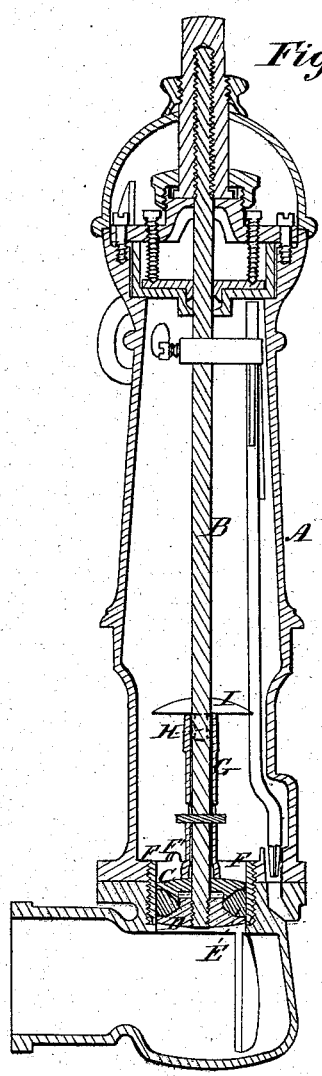
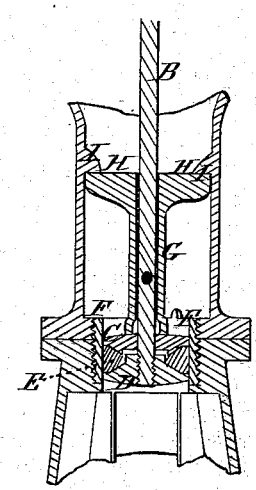
Witnesses:
T. L. Smith
Wm. E. Chiffer
Inventor:
Henry G. Ludlow
by Johnson & Johnson
his Attorneys.

UNITED STATES PATENT OFFICE.

HENRY G. LUDLOW, OF TROY, NEW YORK.

IMPROVEMENT IN VALVES FOR FIRE-PLUGS AND STOP-VALVES.

Specification forming part of Letters Patent No. 154,878, dated September 8, 1874; application filed April 21, 1874.

*To all whom it may concern:*

Be it known that I, HENRY G. LUDLOW, of Troy, in the county of Rensselaer, in the State of New York, have invented certain new and useful Improvements in Valves for Fire-Plugs and Stop-Valves, of which the following is a specification:

The invention herein relates to valves applicable for fire-plugs, globe and other stop valves; and the particular features of novelty consist, first, in the combination, in a fire-plug or stop-valve, of the cylindrical seat with a valve of two disks, an intervening rubber packing, and a stop, with which the outer disk coacts to limit its outward movement, to effect, by their joint action in the upward movement of the inner disk, an expanding pressure upon the packing only, while the disks themselves are free from any pressure within said cylindrical seat, and thereby increase and diminish the pressure upon the packing, as may be desired, according to the degree of force exerted upon the fixed stop; secondly, in the combination, with the separate rubber expanding parts and cylindrical seat, of a stem-sleeve and stops, whereby the outward movement of the stem or disk causes the rubber packing to be expanded against the seat.

In the accompanying drawings, Figure 1 represents a vertical section of a fire-plug embracing my invention, with the valve in an open position; Fig. 2, a similar section with the valve in a closed position.

The plug embracing the barrel or stand-pipe A, the valve-stem B, its operating parts, and the waste-valve rod are made and arranged for joint action, as shown in the drawings; or these parts may be of any approved construction, and adapted for use with my new valve. The valve consists of two parts or disks, C and D, between which a rubber ring or packing, E, is secured and expanded; and one or both of these parts may be carried by the valve-stem. The part D is permanently secured to the valve-stem, and the part C may be fitted loosely thereon or form a part of the valve-seat; but in either case it serves the same function—that is, a resisting part, against which the inner part D compresses the rubber packing, so as to force it out against a cylindrical ring-seat, F, screwed in place at the bottom of the barrel or stand-pipe. When this expansion of the rubber ring E is produced by the outer loose disk C, it is effected by an armed sleeve, G, supported upon the part C and carried by the valve-stem B, so that the closing movement of the valve will cause the arms H of the sleeve G to strike against stops I on the inner side of the barrel, and thereby arrest the movement of the sleeve G and the disk C, while the valve-stem B continues its outward movement against the rubber ring E, to force it out hard against the seat F and render the joint perfectly tight.

In opening the valve the lower disk D separates first from the upper part until the pressure from the rubber ring is relieved, when the valve as a whole descends below the seat, and the water has free course through the plug or case.

The acting parts of the disks may be beveled and made to intermatch; or they may be made of other forms that will expand the rubber, and thereby seal the joint.

The seat F is provided with prongs F', by which and a long-handle wrench the seat can be taken out and replaced without digging up the plug.

It is obvious that a valve operating upon the principle described can be applied, with a slight modification, to globe and other stop valves, and that the stop I may be located in any part of the stand-pipe.

I claim—

1. The combination, in a fire-plug or stop-valve, of the cylindrical seat F with a valve of two disks, C and D, an intervening rubber packing, E, and a stop upon the casing to limit the outward movement of the disk C, substantially as and for the purpose set forth.

2. The combination, with the separate expanding parts C D, their inclosed rubber packing, and the cylindrical seat F, of the armed sleeve G H and the stops I, substantially as and for the purpose described.

HENRY G. LUDLOW.

Witnesses:
JOHN PATERSON,
JOHN H. HAWKINS.